United States Patent
Harada et al.

(10) Patent No.: US 12,108,450 B2
(45) Date of Patent: Oct. 1, 2024

(54) TERMINAL, COMMUNICATION SYSTEM, AND COMMUNICATION METHOD FOR MEASURING FREQUENCY RESOURCE

(71) Applicant: NTT DOCOMO, INC., Tokyo (JP)

(72) Inventors: Hiroki Harada, Tokyo (JP); Daisuke Murayama, Tokyo (JP); Daisuke Kurita, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 351 days.

(21) Appl. No.: 17/596,650

(22) PCT Filed: Jun. 21, 2019

(86) PCT No.: PCT/JP2019/024812
§ 371 (c)(1),
(2) Date: Dec. 15, 2021

(87) PCT Pub. No.: WO2020/255404
PCT Pub. Date: Dec. 24, 2020

(65) Prior Publication Data
US 2022/0304056 A1 Sep. 22, 2022

(51) Int. Cl.
*H04W 74/0816* (2024.01)
*H04B 17/318* (2015.01)
*H04W 72/0453* (2023.01)
*H04W 74/08* (2009.01)

(52) U.S. Cl.
CPC ...... *H04W 74/0816* (2013.01); *H04B 17/318* (2015.01); *H04W 72/0453* (2013.01); *H04W 74/0866* (2013.01)

(58) Field of Classification Search
CPC ......... H04W 72/0453; H04W 74/0816; H04W 74/0866; H04B 17/318
See application file for complete search history.

(56) References Cited

U.S. PATENT DOCUMENTS

| 10,542,564 B2 | 1/2020 | Ouchi et al. |
| 2006/0153141 A1* | 7/2006 | Hirano ............ H04W 56/0035 370/335 |

(Continued)

FOREIGN PATENT DOCUMENTS

| CN | 107925493 A | 4/2018 |
| JP | 2018521541 A | 8/2018 |

OTHER PUBLICATIONS

3GPP TR 38.889 V16.0.0 "3rd Generation Partnership Project; Technical Specification Group Radio Access Network; Study on NR-based access to unlicensed spectrum (Release 16)" Dec. 2018 (119 pages).

(Continued)

*Primary Examiner* — Jeong S Park
(74) *Attorney, Agent, or Firm* — Osha Bergman Watanabe & Burton LLP

(57) ABSTRACT

A terminal includes a receiving unit that receives a signal; a control unit that configures a frequency resource to be measured based on an information element indicating a center frequency or a measurement bandwidth, wherein the information element is included in the signal received by the receiving unit; and a transmitting unit that transmits a result of a Received Signal Strength Indicator (RSSI) measurement or a result of a channel occupancy measurement, wherein the RSSI measurement or the channel occupancy measurement is performed on the frequency resource to be measured that is configured by the control unit.

4 Claims, 11 Drawing Sheets

(56) References Cited

U.S. PATENT DOCUMENTS

| | | | |
|---|---|---|---|
| 2015/0249934 | A1 | 9/2015 | Siomina et al. |
| 2016/0227571 | A1* | 8/2016 | Baek ................. H04W 52/0206 |
| 2016/0338118 | A1 | 11/2016 | Vajapeyam et al. |
| 2018/0124687 | A1 | 5/2018 | Park et al. |
| 2018/0220318 | A1* | 8/2018 | Uemura ............... H04B 17/318 |
| 2018/0351665 | A1* | 12/2018 | Fukuta ................. H04W 16/18 |
| 2019/0053235 | A1 | 2/2019 | Novlan et al. |
| 2019/0149252 | A1* | 5/2019 | Siomina ............... H04B 17/309 370/252 |
| 2019/0149307 | A1* | 5/2019 | Siomina ............... H04B 17/318 370/252 |
| 2019/0342783 | A1* | 11/2019 | Kim ...................... H04W 24/08 |
| 2019/0393969 | A1* | 12/2019 | Kim ..................... H04B 17/318 |
| 2020/0059962 | A1* | 2/2020 | Tejedor ................. H04W 76/14 |

OTHER PUBLICATIONS

3GPP TS 36.331 V15.5.1 "3rd Generation Partnership Project; Technical Specification Group Radio Access Network; Evolved Universal Terrestrial Radio Access (E-UTRA); Radio Resource Control (RRC); Protocol specification (Release 15)" Apr. 2019 (948 pages).

3GPP TS 36.214 V15.3.0 "3rd Generation Partnership Project; Technical Specification Group Radio Access Network; Evolved Universal Terrestrial Radio Access (E-UTRA); Physical layer; Measurements (Release 15)" Sep. 2018 (25 pages).

International Search Report issued in International Application No. PCT/JP2019/024812, mailed Jun. 21, 2019 (5 pages).

Written Opinion issued in International Application No. PCT/JP2019/024812; Dated Jun. 21, 2019 (5 pages).

Office Action issued in counterpart Chinese Patent Application No. 201980097439.1 mailed on Apr. 21, 2023 (18 pages).

Extended European Search Report issued in counterpart European Patent Application No. 19933518.3, mailed on Dec. 13, 2022 (10 pages).

Nokia et al.; "RRM and Connect Mode mobility"; 3GPP TSG-RAN WG2 Meeting #103bis, R2-1814288; Chengdu, China; Oct. 8-12, 2018 (4 pages).

Ericsson; "On initial access, RRM, mobility and RLM"; 3GPP TSG-RAN WG1 Meeting #95, R1-1813459; Spokane, USA; Nov. 12-16, 2018 (15 pages).

* cited by examiner

FIG.2

| QCL Types | QCL parameters |
|---|---|
| A | Doppler shift, Doppler spread, average delay, delay spread |
| B | Doppler shift, Doppler spread |
| C | Average delay, Doppler shift |
| D | Spatial Rx parameter (sQCL) |

FIG.3

```
MeasObjectEUTRA ::=        SEQUENCE {
    carrierFreq            ARFCN-ValueEUTRA,
    allowedMeasBandwidth   AllowedMeasBandwidth,
    rmtc-Config-r13        RMTC-Config-r13     OPTIONAL,      -- Need ON
RMTC-Config-r13 ::= CHOICE {
    release    NULL,
    setup      SEQUENCE {
        rmtc-Period-r13           ENUMERATED {ms40, ms80, ms160, ms320, ms640},
        rmtc-SubframeOffset-r13   INTEGER(0..639)             OPTIONAL,       -- Need ON
        measDuration-r13          ENUMERATED {sym1, sym14, sym28, sym42, sym70},
    ...
    }
}
```

FIG.4

```
                    measRSSI-ReportConfig-r13          MeasRSSI-ReportConfig-r13
                    OPTIONAL,       -- Need ON                    OPTIONAL       -- Need OR MeasRSSI-ReportConfig-r13 ::=  SEQUENCE {
    channelOccupancyThreshold-r13    RSSI-Range-r13
}
```

FIG.5

```
MeasObjectNR ::=            SEQUENCE {
    ssbFrequency                ARFCN-ValueNR                        OPTIONAL    -- Cond SSBorAssociatedSSB
    ssbSubcarrierSpacing        SubcarrierSpacing                    OPTIONAL,   -- Cond SSBorAssociatedSSB
    smtc1                       SSB-MTC                              OPTIONAL,   -- Cond SSBorAssociatedSSB
    ~
    rssiMeasConfig-r16          RSSI-MeasConfig        OPTIONAL,   -- Cond RSSIMeasurement RSSI-MeasConfig ::=         SEQUENCE {
    rmtc-ConfigRMTC-Config
    rssiFrequency               [ARFCN-ValueNR or GSCN-ValueNR]
    rssiBandwidth               ENUMERATED {mbw20, mbw51, mbw106, ...., mbw 273 }
}
```

FIG.6

```
MeasObjectNR ::=         SEQUENCE {
    ssbFrequency             ARFCN-ValueNR                        OPTIONAL,    -- Cond SSBorAssociatedSSB
    ssbSubcarrierSpacing     SubcarrierSpacing                    OPTIONAL,    -- Cond SSBorAssociatedSSB
    smtc1                    SSB-MTC                              OPTIONAL,    -- Cond SSBorAssociatedSSB
    ~
    rssiMeasConfig-r16       RSSI-MeasConfig         OPTIONAL,    -- Cond RSSIMeasurement RSSI-MeasConfig ::=  SEQUENCE {
    rmtc-ConfigRMTC-Config
    rssiFrequency            [ARFCN-ValueNR or GSCN-ValueNR]
}
```

FIG.8

```
MeasObjectNR ::=            SEQUENCE {
    ssbFrequency                ARFCN-ValueNR                                    OPTIONAL,    -- Cond SSBorAssociatedSSB
    ssbSubcarrierSpacing        SubcarrierSpacing                                OPTIONAL,    -- Cond SSBorAssociatedSSB
    smtc1                       SSB-MTC                                          OPTIONAL,    -- Cond SSBorAssociatedSSB
    ~
    rssiMeasConfig-r16          RSSI-MeasConfig                    OPTIONAL,    -- Cond RSSIMeasurement RSSI-MeasConfig ::=         SEQUENCE {
    rmtc-ConfigRMTC-Config
    rssiBandwidth               ENUMERATED {mbw20, mbw51, mbw106, ..., mbw 273 }
}
```

TERMINAL, COMMUNICATION SYSTEM, AND COMMUNICATION METHOD FOR MEASURING FREQUENCY RESOURCE

TECHNICAL FIELD

The present invention relates to a terminal and a communication method in a radio communication system.

BACKGROUND ART

Currently, in the Third Generation Partnership Project (3GPP), access to an unlicensed frequency band based on New Radio (NR) has been studied (Study on NR-based Access to Unlicensed Spectrum; Non-Patent Document 1).

In a case in which the NR-U is used, it is to be ensured that the NR-U system can coexist with another radio access technology (RAT) used in the unlicensed frequency band, for example, a Wi-Fi 802.11ac network. Accordingly, in a case in which the NR-U terminal 20 starts transmission in the unlicensed frequency band, the NR-U terminal 20 is assumed to perform Listen Before Talk (LBT), in order to ensure that there is no transmitting terminal (for example, terminals conforming to the Wi-Fi 802.11ac system) in the vicinity. The LBT is a communication method in which carrier sensing is performed prior to starting a transmission and the transmission within a predetermined time length is allowed only if a channel is not used by another neighboring system.

RELATED ART DOCUMENT

Non-Patent Document

Non-Patent Document 1: 3GPP TR 38.889 V16.0.0 (Dec. 2018)
Non-Patent Document 2: 3GPP TS 36.331 V15.5.1 (Apr. 2019)
Non-Patent Document 3: 3GPP TS 36.214 V15.3.0 (Sep. 2018)

SUMMARY OF THE INVENTION

Problem to be Solved by the Invention

In the study related to 3GPP Release 16 NR-U, it is assumed to support the function of RSSI and channel occupancy for Release 13 LTE-LAA. However, for 3GPP Release 16 NR-U, clarification of a measurement bandwidth for RSSI may be insufficient. There is a need for a method with which an RSSI measurement and a channel occupancy. measurement can be appropriately configured for a terminal in NR-U.

Means for Solving the Problem

According to an aspect of the present invention, there is provided a terminal including a receiving unit that receives a signal; a control unit that configures a frequency resource to be measured based on an information element indicating a center frequency or a measurement bandwidth, wherein the center frequency or the measurement bandwidth is included in the signal received by the receiving unit; and a transmitting unit that transmits a result of a Received Signal Strength Indicator (RSSI) measurement or a result of a channel occupancy measurement, wherein the RSSI measurement or the channel occupancy measurement is performed on the frequency resource to be measured that is configured by the control unit.

Advantage of the Invention

According to an embodiment, a method is provided with which an RSSI measurement and a channel occupancy measurement can be appropriately configured for a terminal in NR-U.

BRIEF DESCRIPTION OF DRAWINGS

FIG. 2 is a diagram illustrating an example of types of QCL.
FIG. 3 is a diagram illustrating an example of MeasObjectEUTRA.
FIG. 4 is a diagram illustrating an example of ReportConfigEUTRA.
FIG. 5 is a diagram illustrating an example of a modification of MeasObjectNR.
FIG. 6 is a diagram illustrating an example of a modification of MeasObjectNR.
FIG. 8 is a diagram illustrating an example of a modification of MeasObjectNR.

EMBODIMENTS OF THE INVENTION

Figure 1:
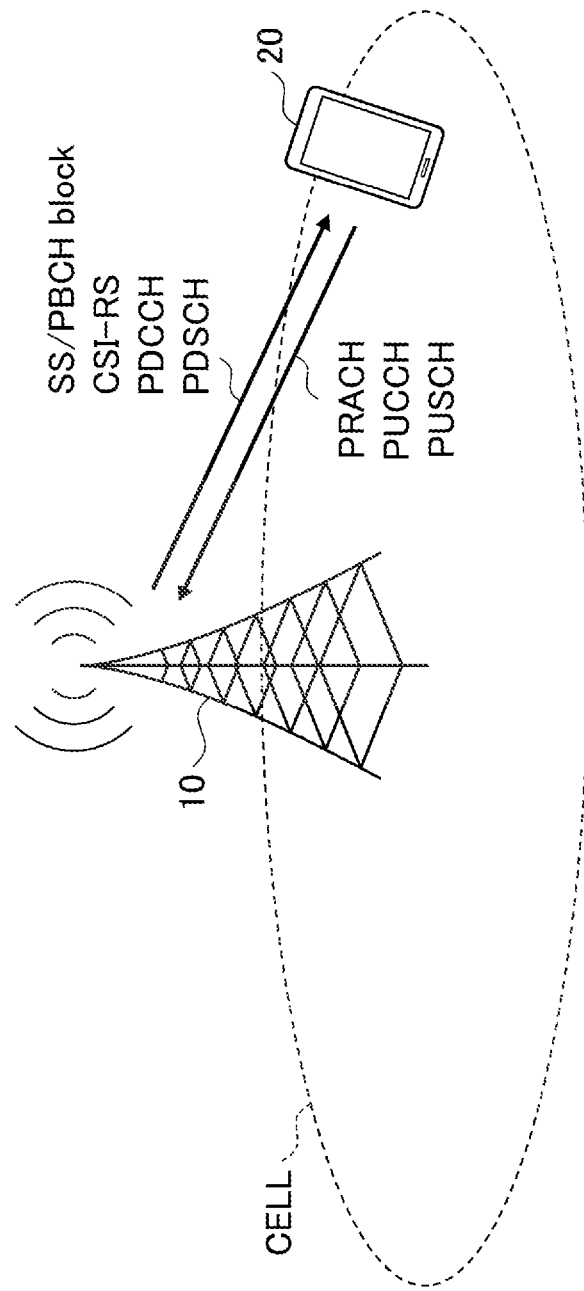
FIG. 1 is a configuration diagram of a communication system according to an embodiment.

In tine following, embodiments of the present invention are described with reference to the drawings. The embodiments described below are merely examples, and embodiments to which the present invention is applied are not limited to the following embodiments.

In the embodiments described below, terms used in the existing LTE are used, such as Synchronization Signal (SS), Primary SS (PSS), Secondary SS (SSS), Physical Broadcast channel (PBCH), and Physical Random Access channel (PRACH). This is for convenience of description, and signals and functions similar to these may be referred to by other names. The above-described terms in NR correspond to NR-SS, NR-PSS, NR-SSS, NR-PBCH, NR-PRACH, and the like. However, even if a signal is used for NR, the signal is not always explicitly indicated as "NR-."

In embodiments of the present invention, a duplex method may be a Time Division Duplex (TDD) method, a Frequency Division Duplex (FDD) method, or any other method (e.g., Flexible Duplexing).

In the following description, a method of transmitting a signal using a transmit beam may be digital beamforming, in which a signal multiplied by a precoding vector (precoded with the precoding vector) is transmitted, or analog beamforming, in which beamforming is implemented using a variable phase shifter in an RF (Radio Frequency) circuit.

Similarly, a method of receiving a signal using a receiving beam may be digital beamforming, in which a received signal is multiplied by a predetermined weight vector, or analog beamforming, in which beamforming is implemented using a variable phase shifter in an RF circuit. Hybrid beamforming combining digital beamforming and analog beamforming may be applied to transmission and/or reception. Transmitting a signal using a transmit beam may be transmitting the signal with a specific antenna port. Similarly, receiving a signal using a receiving beam may be receiving the signal with a specific antenna port. An antenna port may be a logical antenna port or a physical antenna port defined by the 3GPP standard. The above-described precoding or beamforming may be referred to as a precoder, a spatial domain filter, or the like.

Note that a method of forming a transmit beam and receiving beam is not limited to the above-described methods. For example, in a base station 10 or a terminal 20 having multiple antennas, a method of changing an angle of each antenna may be used, a method of using a precoding vector and a method of changing the angle of the antenna may be used, a method of switching different antenna panels may be used, a method of combining multiple antenna panels may be used, or other methods may be used. For example, in a high frequency band, a plurality of mutually different transmit beams may be used. The use of multiple transmit beams is called multi-beam operation, and the use of a single transmit beam is called single-beam operation.

In the embodiments of the present invention, "configuring" a radio parameter or the like may include pre-configuring a predetermined value, or configuring the radio parameter signalled from the base station 10 or the terminal 20.

FIG. 1 is a diagram illustrating a radio communication system according to an embodiment of the present invention. The radio communication system in an embodiment of the present invention includes a base station 10 and a terminal 20, as depicted in FIG. 1. In FIG. 1, one base station 10 and one unit of the terminal 20 are depicted. However, this is an example, and, for each of the devices, there may be a plurality of devices.

The base station 10 is a communication device that provides one or more cells and performs radio communication with the terminal 20. A physical resource of a radio signal is defined in a time domain and a frequency domain, the time domain may be defined by a number of OFDM symbols, and the frequency domain may be defined by a number of sub-carriers or a number of resource blocks. The base station 10 transmits a synchronization signal and system information to the terminal 20. A synchronization signal is, for example, NR-PSS and NR-SSS. A part of system information is transmitted, for example, by NR-PBCH, which is also called broadcast information. A synchronization signal and broadcast information may be periodically transmitted as an as block (SS/PBCH block) consisting of a predetermined number of OFDM symbols. For example, the base station 10 transmits a control signal or data in DL (Downlink) to the terminal 20 and receives a control signal or data in UL (Uplink) from the terminal 20. The base station 10 and the terminal 20 are capable of transmitting and receiving signals while performing beamforming. For example, as shown in FIG. 1, a reference signal transmitted from the base station 10 includes a Channel State Information Reference Signal (CSI-RS), and a channel transmitted from the base station 10 includes Physical Downlink Control Channel (PDCCH) and Physical Downlink Shared Channel (PDSCH).

The terminal 20 is a communication device provided with a radio communication function, such as a smartphone, a cellular phone, a tablet, a wearable terminal, and a communication module for Machine-to-Machine (M2M). The terminal 20 may be referred to as a user equipment (User Equipment, UE) 20. The terminal 20 utilizes various communication services provided by a radio communication system by receiving a control signal or data in DL from the base station 10 and transmitting a control signal or data in UL to the base station 10. For example, as illustrated in FIG. 1, channels transmitted from the terminal 20 include Physical Uplink Control Channel (PUCCH) and Physical Uplink Shared Channel (PUSCH).

In the New Radio (NR), in order to secure coverage for communications using radio waves in a high frequency band, beamforming is applied to transmission of data in a Physical Downlink Shared Channel (PDSCH), transmission of a control signal in a Physical Downlink Control Channel (PDCCH), transmission of a synchronization signal and broadcast information in a Synchronization Signal/Physical Broadcast Channel (SS/PBCH) Block (SSB), and transmission of a reference signal (Channel State Information Signal (CSI-RS)/Demodulation Reference Signal (DMRS)).

For example, in Frequency Range 2 (FR2), i.e., in a frequency band of millimeter wave higher than or equal to 24 GHz, 64 beams can be used for transmission of SSBs, and in Frequency Range 1 (FR1), i.e., in a sub-6 GHz frequency band, 8 beams can be used for transmission of SSBs.

For performing communication using a beam, beam management or beam control is important. For example, if there are two beams, the base station 10 may need to signal to the terminal 20 which beam is used to transmit the signal. A Transmission Configuration Indication (TCI) state is specified so as to transmit, to the terminal 20, a notification of the beam to be used, or to transmit, to the terminal 20, a notification of switching of a beam to be used.

Details to be signaled by a TCI state include Quasi-Co-Location (QCL) that indicates it is possible to assume that one reference signal (RS) and one channel are identical radio channels, or the one reference signal (RS) and the one channel have the same radio property (the same beam).

For example, the fact that a reference signal, such as a CSI-RS (or SS/PBCH), and a PDSCH that is a channel for transmitting data are QCL implies that the reference signal and the data have a relationship such that the reference signal and the data are transmitted with a same beam.

As illustrated in FIG. 2, four types of QCL are defined from A to D. For signaling beam information, QCL type D is mainly used. QCL Type D implies that transmissions by the same beam. Other than that, for example, QCL Type A is used for signaling colocation, for example, whether the base stations 10 are located at a same location.

Currently, in the Third Generation Partnership Project (3GPP), an access to an unlicensed frequency band based on New Radio (NR) has been studied (Study on NR-based Access to Unlicensed Spectrum, for example, Non-Patent Document 1).

In the study of New Radio Unlicensed (NR-U), the use of an unlicensed frequency band of lower than or equal to 7 GHz has been mainly studied. As a system deployment scenario, for example, the following scenarios have been studied: a scenario in which carrier aggregation is performed between NR and NR-U; a scenario in which dual connectivity is performed between LTE or NR and NR-U; an NR-U standalone scenario; and a scenario in which an unlicensed frequency band is used for the downlink (DL) and a licensed frequency band is used for the uplink (UL) in the stand-alone scenario.

In a case in which the NR-U is used, it is to be ensured that the NR-U system can coexist with another radio access technology (RAT) used in the unlicensed frequency band, for example, a Wi-Fi 802.11ac network. Accordingly, in a case in which the NR-U terminal 20 starts transmission in the unlicensed frequency band, the NR-U terminal 20 is assumed to perform Listen Before Talk (LBT), in order to ensure that there is no transmitting terminal (for example, terminals conforming to the Wi-Fi 802.11ac system) in the vicinity. The LBT is a communication method in which carrier sensing is performed prior to starting a transmission and the transmission within a predetermined time length is allowed only if a channel is not used by another neighboring system.

As described above, currently, NR-U has been studied in 3GPP. A system that performs communication by using an unlicensed carrier frequency band in the LTE system is defined as License Assisted Access (LAA). In the LTE LAA, Received Signal Strength Indicator (RSSI) and channel occupancy (CO) measurement are defined.

The RSSI is defined in Non-Patent Document 3. The Received Signal Strength Indicator (RSSI) of E-UTRA is a linear average of total received power observed by the terminal 20 only in a configured OFDM symbol and from all resources in a measurement bandwidth over N number of resource blocks. A higher layer indicates a measurement duration of the RSSI and an OFEM symbol to be measured for the terminal 20. The RSSI includes a main signal and a signal on the same channel of a non-serving cell, interference from an adjacent channel, and thermal noise. The RSSI is the power of a signal that is not demodulated, and the terminal 20 can measure the RSSI without performing synchronization and demodulation. As a result of measuring the RSSI by the terminal 20 on an unlicensed frequency band and reporting the RSSI to the base station 10, the base station 10 can confirm whether there is a hidden terminal whose presence has not been confirmed by the base station 10 in the vicinity of the terminal 20.

A channel occupancy (CO) is a ratio of a time during which RSSI that is greater than a configured threshold value is observed. By measuring a CO, it can be determined whether a hidden terminal frequently performs transmissions, or a hidden terminal performs almost no transmission.

Non-Patent Document 2 describes a function of the terminal 20 for measuring RSSI and for reporting the measured RSSI to the base station 10. In the following, the outline of the function for measuring and reporting the RSSI described in Non-Patent Document 2 is described.

The terminal 20 performs an RSSI measurement on a time resource configured by an RSSI measurement timing configuration (RMTC). Here, the RMTC is configured based on parameters received by the terminal 20, which include rmtc-Period, rmtc-SubframeOffset, and measDuration.

The terminal 20 measures RSSI and measures a CO, if measRSSI-ReportConfig is configured in reportConfig.

The terminal 20 sets an RSSI measurement value in rssi-Result and sets, in channelOccupancy, a ratio of samples whose RSSI measurement value exceeds a threshold value, and the terminal 20 reports the rssi-Result and the channelOccupancy to the base station 10.

FIG. 3 is a diagram illustrating an example of MeasObjectEUTRA. As illustrated in FIG. 3, the MeasObject-EUTRA. includes carrierFreq and allowedMeasBandwidth. The maximum bandwidth that can be used as a measurement band is provided by a parameter allowedMeasBandwidth. The terminal 20 is allowed to perform a measurement in any number of RBs as long as the number of RBs is within the range of the maximum bandwidth indicated by the allowedMeasBandwidth. In addition, the MeasObjectEUTRA includes RMTC-Config. The RMTC-Config includes rmtc-Period, rmtc-SubframeOffset, and measDuration.

FIG. 4 is a diagram illustrating an example of ReportConfigEUTRA. As illustrated in FIG. 4, the ReportConfigEUTRA includes MeasRSSI-ReportConfig, and channelOccupancyThreshold can be set in the MeasRSSI-ReportConfig. That is, the threshold value of the RSSI for measuring a CO can be set by setting a value to the channelOccupancyThreshold of the ReportConfigEUTRA.

3GPP Release 16 NR-U

It assumed to support a function for an RSSI measurement and a channel occupancy measurement according to Release 13 LTE-LAA for 3GPP release 16 NR-U.

In addition, the following items are to be studied.
Enhancement of an RSSI measurement standard (metrics). For example, sub-band-level interference measurements in a wideband operation scenario.
Reporting of a new medium contention/load metric other than channel occupancy.
A modification of the parameters of the Rel-15 SS/PBCH Block Measurement Timing Configuration (SMTC) for operation in an unlicensed frequency band.

Problem

A measurement bandwidth for RSSI is not sufficiently clarified for 3GPP Release 16 NP-U.

In an LTE RSSI/CO measurement, carrierFreq and AllowedMeasBandwidth are configured in MeasObject-EUTRA. A center frequency for a measurement can be set by setting a value to carrierFreq, and, by setting a value to AllowedMeasBandwidth, a maximum allowed measurement bandwidth on the carrier frequency can be indicated.

In contrast, in Release 15 NR, no parameter exists that corresponds to carrierFreq and AllowedMeasBandwidth in LTE. A carrier frequency of an SSB is included in MeasObjectNR to be used for configuring an SSB-based measurement, and a bandwidth of the SSB is fixed to 20 PRBs. Accordingly, MeasObjectNR does not include a parameter for indicating a measurement bandwidth. A measurement of RSSI can be performed with a carrier frequency of an SSB and a bandwidth of the SSB. However, in this method, a degree of freedom for configuring a measurement bandwidth for measuring RSSI may be insufficient. An NR-U carrier bandwidth is assumed to be approximately no to 100 MHz (273 PRBs with 30 kHz subcarrier spacing), while the SSB bandwidth is 20 PRBs. According to the method of measuring RSSI with a carrier frequency of an SSB and a bandwidth of the SSB, the RSSI and the CO may be measured only at a part of a local bandwidth.

There is a need for a method that allows to appropriately configure an RSSI measurement and a channel occupancy measurement in NR-U.

Proposal 1

For configuring an RSSI measurement and a channel occupancy measurement, a method for determining a center frequency and a measurement bandwidth of a frequency resource to be measured is defined.

Example 1 of Proposal 1

The base station 10 may explicitly configure a center frequency and a measurement bandwidth (the number of PRBs) of a frequency resource to be measured in MeasObjectNR, and the base station 10 may explicitly transmit a notification of the center frequency and the measurement bandwidth of the frequency resource to be measured by transmitting a message including MeasObjectNR to the terminal 20.

The center frequency of the measurement band may be set by using an Absolute radio-frequency channel number (ARFCN), that is, a subcarrier number. Alternatively, the center frequency of the measurement band may be set by using a Global Synchronization Channel Number (GSCN), that is, an SS raster number. Here, the center frequency of the measurement band may be separately set from ssbFrequency configured in the MeasObjectNR (the center frequency of the measurement band may be set to a value different from the value of the ssbFrequency).

The measurement bandwidth may be set by using the number of Physical Resource Blocks (PRBs). The minimum value of the measurement bandwidth may be 20 PRBs. The maximum value of the measurement bandwidth may be the number of PRBs corresponding to a bandwidth of 20 MHz (106 PRBs for a subcarrier spacing of 15 kHz and 51 PRBs for a subcarrier spacing of 30 kHz) or the maximum number of PRBs that can be configured as a carrier bandwidth (270 PRBs for a subcarrier spacing of 15 kHz and 273 PRBs for a subcarrier spacing of 30 kHz). Alternatively, the maximum value of the measurement bandwidth may be the maximum configurable number of PRBs, which is an integral multiple of 20 MHz (216 PRBs for a subcarrier spacing of 15 kHz and 273 PRBs for a subcarrier spacing of 30 kHz).

The measurement bandwidth (PRB) configured in the MeasObjectNR may be a maximum allowable Bandwidth, that is, the maximum bandwidth that can be used as the measurement band. In this case, the terminal 20 may perform a measurement in any number of PRBs as long as the number of PRBs is within the range of the measurement bandwidth configured in the MeasObjectNR. Alternatively, it may be specified that the terminal 20 always performs a measurement on a measurement bandwidth (PRBs) configured in the MeasObjectNR.

FIG. 5 is a diagram illustrating an example of a modification of MeasObjectNR corresponding to Example 1 of Proposal 1. As illustrated in FIG. 5, the center frequency of the measurement band may be specified by rssiFrequency included in RSSI-MeasConfig and the measurement bandwidth may be specified by rssibandwidth included in the RSSI-MeasConfig.

Example 2 of Proposal 1

The base station 10 may explicitly transmit a notification of a center frequency of a frequency resource to be measured by explicitly setting the center frequency of the frequency resource to be measured in MeasObjectNR and transmitting a message including the MeasObjectNR to the terminal 20.

The center frequency of the measurement band may be set by using an Absolute radio-frequency channel number (ARFCN), that is, a subcarrier number. Alternatively, the center frequency of the measurement band may be set by using a Global Synchronization Channel Number (GSCN), that is, an SS raster number. Here, the center frequency of the measurement band may be separately set from the ssbFrequency configured in the MeasObjectNR (the center frequency of the measurement band may be set to a value different from the value of the ssbFrequency).

For example, the measurement bandwidth may be defined by a technical specification. Alternatively, the measurement bandwidth may depend on the implementation of the terminal 20. For example, by a technical specification, the measurement bandwidth may be defined as the number of PRBs corresponding to a bandwidth of 20 MHz (106 PRBs for a subcarrier spacing of 15 kHz and 51 PRBs for a subcarrier spacing of 30 kHz). Alternatively, by a technical specification, the measurement bandwidth may be defined as the maximum number of PRBs that can be configured as the carrier bandwidth (270 PRBs for a subcarrier spacing of 15 kHz and 273 PRBs for a subcarrier spacing of 30 kHz). Alternatively, by a technical specification, the measurement bandwidth may be defined as the maximum configurable number of PRBs that is an integral multiple of 20 MHz (216 PRBs for a subcarrier spacing of 15 kHz and 273 PRBs for a subcarrier spacing of 30 kHz). Alternatively, by a technical specification, the measurement bandwidth may be defined to be 20 PRBs that is equal to the SSB bandwidth.

When a value of a measurement bandwidth is defined by a technical specification, the value may be a maximum allowable bandwidth, that is, the maximum bandwidth that can be used as the measurement band. In this case, the terminal 20 may perform measurement in any number of PRBs as long as the number of PRBs is within the range of the defined measurement bandwidth. Alternatively, it may be specified that the terminal 20 always performs a measurement in the defined measurement bandwidth (PRB).

FIG. 6 is a diagram illustrating an example of a modification of the MeasObjectNR corresponding to Example 2 of Proposal 1. As illustrated in FIG. 6, a center frequency of a measurement band may be specified by the rssiFrequency included in the RSSI-MeasConfig.

Example 3 of Proposal 1

The base station 10 may explicitly transmit a notification of a measurement bandwidth of a frequency resource to be measured by explicitly setting a measurement bandwidth (the number of PRBs) of the frequency resource to be measured in MeasObjectNR and transmitting the MeasObjectNR to the terminal 20.

A measurement bandwidth may be set by using the number of Physical Resource Blocks (PRBs). The minimum value of the measurement bandwidth may be 20 PRBs. The maximum value of the measurement bandwidth may be the number of PRBs corresponding to a bandwidth of 20 MHz (106 PRBs for a subcarrier spacing of 15 kHz and 51 PRBs for a subcarrier spacing of 30 kHz) or the maximum number of PRBs that can be configured as the carrier bandwidth (270 PRBs for a subcarrier spacing of 15 kHz and 273 PRBs for a subcarrier spacing of 30 kHz). Alternatively, the maximum value of the measurement bandwidth may be the maximum configurable number of PRBs that is an integral multiple of 20 MHz (216 PRBs for a subcarrier spacing of 15 kHz and 273 PRBs for a subcarrier spacing of 30 kHz).

A measurement bandwidth (PRB) set in MeasObjectNR may be the maximum allowable Bandwidth, that is, the maximum bandwidth that can be used as the measurement band. In this case, the terminal 20 may perform a measurement in any number of PRBs as long as the number of PRBs is within the range of the measurement bandwidth configured in the MeasObjectNR. Alternatively, it may be specified that the terminal 20 always perform a measurement in the measurement bandwidth (PRB) configured in the MeasObjectNR.

Figure 7:
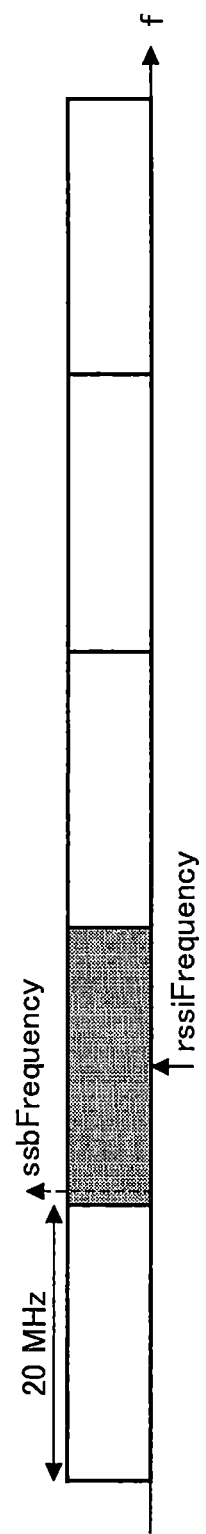
FIG. 7 is a diagram illustrating an example of setting a center of a 20 MHz bandwidth including an ssb-frequency, as a center frequency of a measurement bandwidth.

The terminal 20 may set a center frequency of a measurement band to a frequency that is implicitly indicated by ssb-frequency. For example, as illustrated in FIG. 7, the terminal 20 may set, as the center frequency of the measurement band, the center of a bandwidth of 20 MHz including the ssb-frequency within a frequency grid that is no a per 20 MHz basis specified by a technical specification.

FIG. 8 is a diagram illustrating an example of a modification of the MeasObjectNR corresponding to Example 3 of Proposal 1. As illustrated in FIG. 8, a measurement bandwidth may be specified by the rssiBandwidth included in the RSSI-MeasConfig.

Example 4 of Proposal 1

The base station 10 may transmit a message including MeasObjectNR to the terminal 20, without configuring a center frequency and a measurement bandwidth (the number of PRBs) of a frequency resource to be measured in the MeasObjectNR.

In this case, the terminal 20 may set the center frequency of the frequency resource to be measured based on another parameter, such as the ssb-frequency, as in Example 3 of Proposal 1. In addition, the measurement bandwidth of the frequency resource to be measured may be defined by a technical specification or may depend on the implementation of the terminal 20, as in Example 2 of Proposal 1.

Proposal 2

When a carrier bandwidth is wide, the terminal 20 is assumed to perform an RSSI measurement and a channel occupancy measurement for each resource of a plurality of resources included in the carrier bandwidth, and to report the measurement result for each resource of the plurality of resources to the base station 10. Alternatively, even if the carrier bandwidth is wide, the terminal 20 is assumed to collectively perform an RSSI measurement and a channel occupancy measurement for all the resources included in the wide carrier bandwidth, and to report the measurement result to the base station 10.

Figure 9:
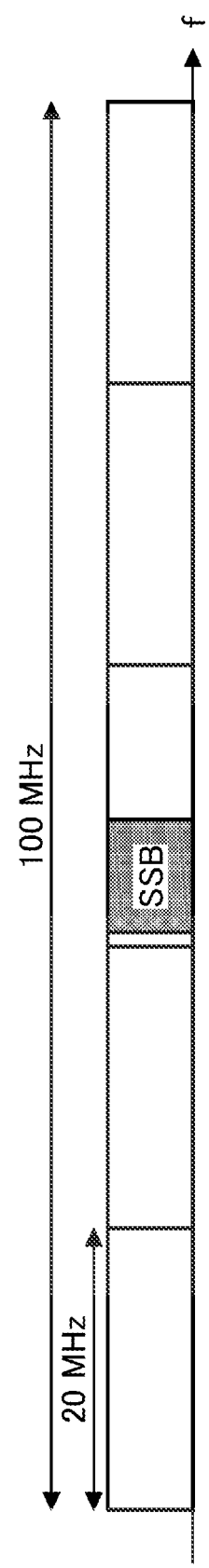
FIG. 9 is a diagram illustrating an example of an assumed scenario using a broadband including a plurality of LBT bandwidths, as a carrier bandwidth.

FIG. 9 is a diagram illustrating an example of an assumed scenario corresponding to the above-described case. As illustrated in FIG. 9, in the assumed scenario, it is assumed that a wide band (for example, 100 MHz) including a plurality of LBT bandwidths (for example, 20 MHz) is used as the carrier bandwidth. The SSB may be transmitted in only a part of the LBT bandwidth as illustrated in FIG. 9. The results of the RSSI measurement and the channel occupancy measurement may differ on a per LBT bandwidth basis. As described above, if the measurement result may differ on a per LBT bandwidth basis, an RSSI measurement and a channel occupancy measurement may be performed on a per LBT bandwidth basis. Furthermore, a case is considered in which it suffices if an RSSI measurement and a channel occupancy measurement are collectively performed on a wide band (100 MHz in the example of FIG. 9).

In Proposal 2, a method is defined for configuring an RSSI measurement and a channel occupancy measurement on each of (or collectively on) a plurality of frequency resources included in a NR-U carrier bandwidth.

Example 1 of Proposal 2

The base station 10 may explicitly transmit a notification of a plurality of center frequencies and a plurality of measurement bandwidths corresponding to a plurality of frequency resources to be measured by explicitly configuring the plurality of center frequencies and the plurality of measurement bandwidths (the numbers of PRBs) in MeasObjectNR and transmitting a message including the MeasObjectNR to the terminal 20. In this case, the maximum number of center frequencies and measurement bandwidths that can be configured in the MeasObjectNR may be defined to be 5 (or 4). Here, if the maximum number of center frequencies and measurement bandwidths that can be configured in the MeasObjectNR is 4 and the number of center frequencies and measurement bandwidths that are actually configured is 5, the terminal 20 may implicitly determine one center frequency and one measurement bandwidth which have not been explicitly notified in the MeasObjectNR from, for example, the ssbFrequency.

Example 2 of Proposal 2

The base station 10 may explicitly transmit a notification or a plurality of center frequencies corresponding to a plurality of frequency resources to be measured by explicitly configuring the plurality of center frequencies corresponding to the plurality of frequency resources to be measured in MeasObjectNR and transmitting a message including the MeasObjectNR to the terminal 20. In this case, the base station 10 may explicitly set one value in the MeasObjectNR that is common among a plurality of measurement bandwidths (the numbers of PRBs) corresponding to the plurality of frequency resources to be measured, and transmit the one value to the terminal 20. The maximum number of center frequencies that can be set in the MeasObjectNR may be defined to be 5 (or 4). Here, if the maximum number of center frequencies that can be set in the MeasObjectNR is 4 and the number of center frequencies that are actually set is 5, the terminal 20 may implicitly determine one center frequency which has not been explicitly notified in the MeasObjectNR from, for example, the ssbFrequency. Alternatively, similar to the case of Example 2 of Proposal 1, the measurement bandwidths may be specified by a technical specification, or depend on the implementation of the terminal 20, without explicitly transmitting the measurement bandwidths in the MeasObjectNR.

Example 3 of Proposal 2

The base station 10 may explicitly transmit a notification of one center frequency and one measurement bandwidth by explicitly setting the one center frequency and the one measurement bandwidth in MeasObjectNR and transmitting a message including the MeasObjectNR to the terminal 20. Note that, as a modified example of the Example 3 of Proposal 2, similar to Proposal 1, the base station 10 may explicitly transmit a notification of a center frequency by explicitly setting the one center frequency in MeasObjectNR and transmitting a message including the MeasObjectNR. In this case, the measurement bandwidth may be defined by, for example, a technical specification. Alternatively, the measurement bandwidth may depend on the implementation of the terminal 20. Furthermore, as another modified example of the Example 3 of Proposal 2, similar to Proposal 1, the base station 10 may explicitly transmit a notification of a measurement bandwidth of a frequency resource to be measured by explicitly configuring the measurement bandwidth (the number of PRBs) in MeasObjectNR and transmitting a message including the MeasObjectNR to the terminal 20. In this case, the terminal 20 may set the center frequency of the measurement band to a frequency implicitly indicated by the ssb-frequency. Furthermore, as still another modified example of the Example 3 of Proposal 2, the base station 10 may transmit a message including the MeasObjectNR to the terminal 20, without configuring a center frequency and a measurement bandwidth (the number of PRBs) of a frequency resource to be measured in the MeasObjectNR. In this case, the terminal 20 may set a center frequency of the frequency resource to be measured based on another parameter, such as the ssb-frequency. Furthermore, the measurement bandwidth of the frequency resource to be measured may be defined by a technical specification or may depend on the implementation of the terminal 20.

In each of Example 1, Example 2, and Example 3 of the above-described Proposal 2, the upper limit of the value of the configurable measurement bandwidth may be the number of PRBs corresponding to 20 MHz. If the upper limit of the value of the configurable measurement bandwidth is the number of PRBs corresponding to 20 MHz, the terminal 20 may perform the RSSI measurement and the channel occupancy measurement in the measurement bandwidths corresponding to the number of configured center frequencies.

Alternatively, in each of Example 1, Example 2, and Example 3 of the above-described Proposal 2, the upper limit of the value of the configurable measurement bandwidth may be greater than the number of PRBs corresponding to 20 MHz. If the upper limit of the configurable measurement bandwidth is greater than the number of PRBs corresponding to 20 MHz, the terminal 20 needs to determine whether to collectively perform the RSSI measurement and the channel occupancy measurement in the configured measurement bandwidth or to divide the configured measurement band into a plurality of measurement bandwidths and perform the RSSI measurement and the channel occupancy measurement in each of the plurality of measurement bandwidths. Accordingly, it may be specified in a technical specification that, in a case of the upper limit of the configurable measurement bandwidth being set to be greater than the number of PRBs corresponding to 20 MHz, when the number of PRBs that is greater than the number of PRBs corresponding to 20 MHz is configured as the measurement bandwidth, the terminal 20 is to perform an RSSI measurement and a channel occupancy measurement separately for each measurement bandwidth corresponding to 20 MHz and to report the measurement result.

Alternatively, in a case of the upper limit of the configurable measurement bandwidth being set to be greater than the number of PRBs corresponding to 20 MHz, when the number of PRBs that is greater than the number of PRBs corresponding to 20 MHz is configured as the measurement bandwidth, it may be possible to configure, by using another Information Element (IE), whether the terminal 20 is to perform and report an RSSI measurement and a channel occupancy measurement separately for each measurement bandwidth corresponding to 20 MHz, or the terminal 20 is to perform and report an RSSI measurement and a channel occupancy measurement collectively on a wide band.

The RSSI measurement and the reporting may be useful in a licensed frequency band. Specifically, a case is considered in which the base station 10 is to cause the terminal 20 to measure and report the degree of interference based on the traffic load of neighboring cells for a carrier on which the base station 10 does not transmit an SSB. As another example, a case is considered in which a plurality of carriers from the base station 10 is co-located, so that a measurement of Reference Signal Received Power (RSRP) on one carrier by the terminal 20 is sufficient (it can be considered that the RSRP on another carrier is approximately the same because the other carrier is co-located). In this case, the RSSI may differ for each carrier since the RSSI depends on the interference in each carrier based on the traffic load in the neighboring cells. Accordingly, only an RSSI measurement may be configured for the terminal 20, without configuring an RSRP measurement.

The RSSI measurement and reporting function may also be usable for a carrier other than the NR-U carrier. In this case, the terminal 20 may assume that a channel occupancy measurement is not to be performed, except for the NR-U carrier. Alternatively, it may be configurable as to whether the terminal 20 performs a channel occupancy measurement on a carrier other than the NR-U carrier.

UE capability related to the RSSI measurement and the reporting may be defined independently of UE capability indicating the support of NR-U. For example, it may be specified that the terminal 20 that supports the NR-U communication function always supports the function for the RSSI measurement and reporting. Alternatively, it may be optional that the terminal 20 supporting the NR-U communication function supports the function for the RSSI measurement and reporting.

As described above, accuracy for detecting a congestion state of a channel and for detecting a hidden terminal can be enhanced by allowing an RSSI measurement and a channel occupancy measurement to be configurable in NR-U.

Device Configuration

Next, an example of a functional configuration of each of the base station 10 and the terminal 20 for executing the processing operation described above is described. Each of the base station 10 and the terminal 20 includes all the functions described in the embodiments. However, each of the base station 10 and the terminal 20 may include a part of a function of the all functions described in the embodiments.

<Base Station 10>

Figure 10:
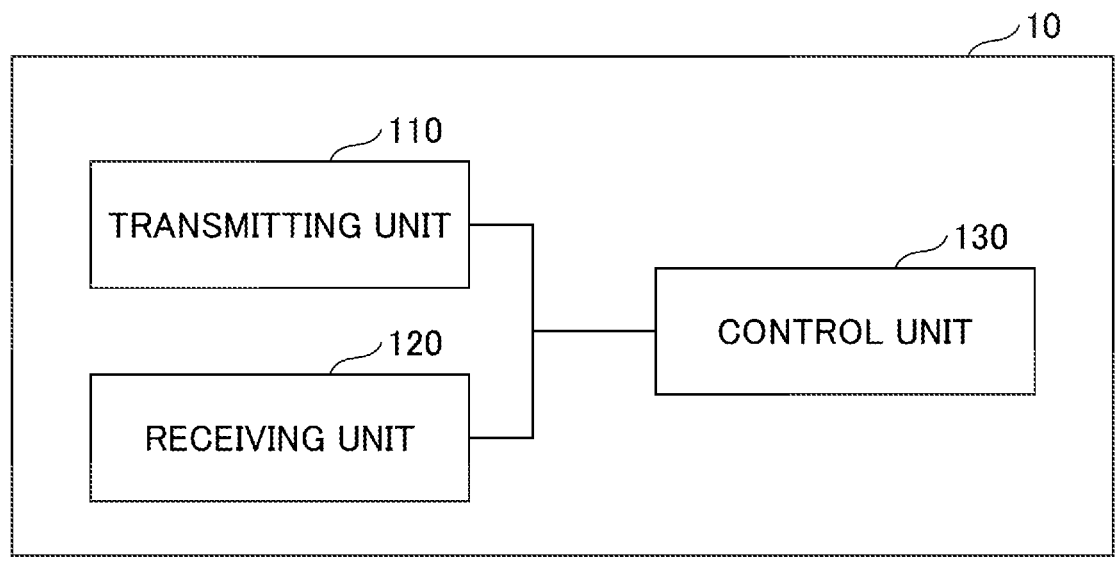
FIG. 10 is a diagram illustrating an example of a functional configuration of a terminal.

FIG. 10 is a diagram illustrating an example of the functional configuration of the base station 10. As illustrated in FIG. 10, the base station 10 includes a transmitting unit 110, a receiving unit 120, and a control unit 130. The functional configuration illustrated in FIG. 10 is merely an example. The functional division and names of functional units may be any division and names, provided that the operation according to the embodiments of the present invention can be performed.

The transmitting unit 110 includes a function for generating a transmit signal from transmit data, and the transmitting unit 110 transmits the transmit signal through radio. The receiving unit 120 receives various types of signals through radio, and the receiving unit 120 obtains a higher layer signal from the received physical layer signal. Furthermore, the receiving unit 120 includes a measurement unit that performs measurement of a received signal to obtain received power, and so forth.

The control unit 130 controls the base station 10. Note that a function of the control unit 130 related to transmission may be included in the transmitting unit 110 and a function of the control unit 130 related to reception may be included in the receiving unit 120.

In the base station 10, the control unit 130 may apply LBT for transmitting a radio signal in an unlicensed frequency band. Specifically, the control unit 130 may perform carrier sensing prior to transmitting a radio signal, and the control unit 130 may transmit a radio signal within a predetermined time length only if the control unit 130 can confirm that a channel is not used by another system in a vicinity.

The control unit 130 of the base station 10 may explicitly configure a center frequency and/or a measurement bandwidth (the PRB number) of a frequency resource to be measured in MeasObjectNR, and the transmitting unit 110 may transmit a message including the configured MeasObjectNR to the terminal 20. Alternatively, the control unit 130 of the base station 10 may avoid configuring a center frequency and a measurement bandwidth or a frequency resource to be measured in MeasObjectNR.

Furthermore, the control unit 130 may set a center frequency of a measurement band by using ARFCN, i.e., a subcarrier number, or the control unit 130 may set a center frequency of a measurement band using GSCN, i.e., an SS raster number.

Furthermore, the control unit 130 may set the measurement bandwidth by using a PRB number.

Furthermore, the control unit 130 of the base station 10 may explicitly configure a plurality of center frequencies and/or a plurality of measurement bandwidths (the PRB number) corresponding to a plurality of frequency resources to be measured in the MeasObjectNR, and the transmitting unit 110 may transmit a message including the configured MeasObjectNR to the terminal 20.

<Terminal 20>

Figure 11:
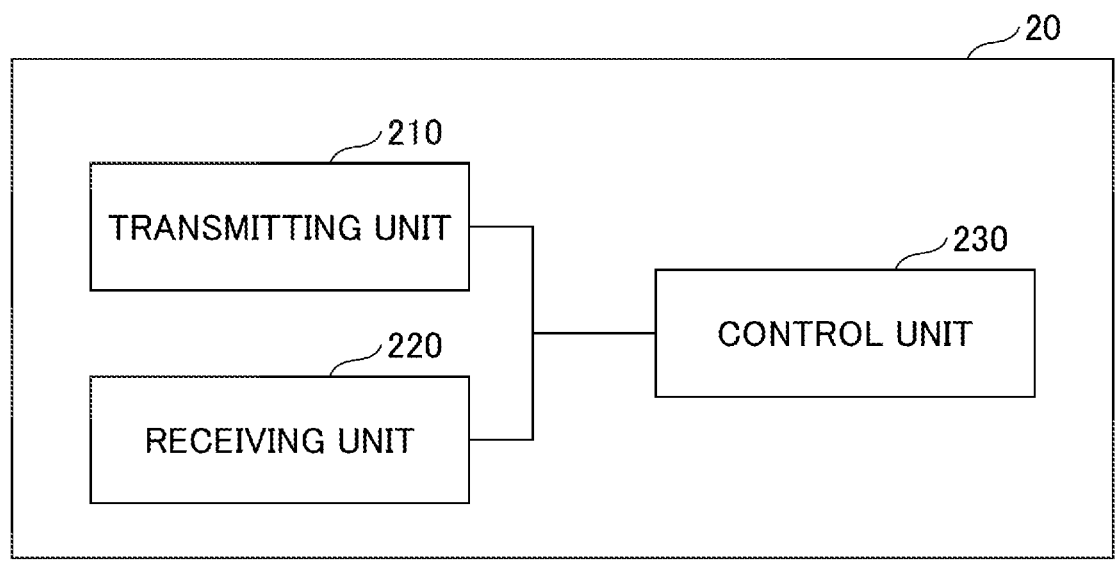
FIG. 11 is a diagram illustrating an example of a functional configuration or a base station.

FIG. 11 is a diagram illustrating an example of the functional configuration of the terminal 20. As illustrated in FIG. 11, the terminal 20 includes a transmitting unit 210, a receiving unit 220, and a control unit 230. The functional configuration illustrated in FIG. 11 is merely an example. The functional division and names of functional units may be any division and names, provided that the operation according to the embodiments can be performed.

The transmitting unit 210 includes a function for generating a signal to be transmitted to the base station 10 and transmitting the signal through radio. The receiving unit 220 includes a function for receiving various types of signals transmitted from the base station 10 and obtaining, for example, higher layer information from the received signals. The receiving unit 220 includes a measurement unit that measures a received signal to obtain a received power.

The control unit 230 controls the terminal 20. The function of the control unit 230 related to transmission may be included in the transmitting unit 210, and the function of the control unit 230 related to reception may be included in the receiving unit 220.

In an unlicensed frequency band, the receiving unit 220 receives a signal transmitted from the base station 10. The control unit 230 sets a center frequency and a measurement bandwidth of a frequency resource to be measured on which an RSSI measurement and a channel occupancy measurement are to be performed, from the MeasObjectNR included in a signal received by the receiving unit 220. The receiving unit 220 of the terminal 20 performs an RSSI measurement and a channel occupancy measurement on a frequency resource to be measured that is configured by the control unit 230, and the transmitting unit 210 of the terminal transmits a signal including a result of the RSSI measurement and the channel occupancy measurement to the base station 10.

The control unit 230 may determine to perform a measurement on a number of PRBs within a range of a measurement bandwidth configured in the MeasObjectNR, and the receiving unit 220 may perform an RSSI measurement and a channel occupancy measurement on the number of PRBs determined by the control unit 230. Alternatively, the control unit 230 may determine to perform a measurement on a measurement bandwidth configured in the MeasObjectNR, and the receiving unit 220 may perform an RSSI measurement and a channel occupancy measurement on the measurement bandwidth determined by the control unit 230.

The control unit 230 may set a plurality of center frequencies and a plurality of measurement bandwidths of a plurality of frequency resources to be measured on which an RSSI measurement and a channel occupancy measurement are to be performed, from the MeasObjectNR included in a signal received by the receiving unit 220. The receiving unit 220 of the terminal 20 may perform an RSSI measurement and a channel occupancy measurement on a plurality of frequency resources to be measured that are configured by the control unit 230, and the transmitting unit 210 of the terminal 20 may transmit a signal including a result of the RSSI measurement and the channel occupancy measurement to the base station 10.

Upon detecting that an upper limit of a value of a measurement bandwidth that can be configured is a PRB number corresponding to 20 MHz, the control unit 230 may configure to perform an RSSI measurement and a channel occupancy measurement on the number of measurement bandwidths corresponding to the number of center frequencies configured.

Upon detecting that a PRB number that is greater than the PRB number corresponding to 20 MHz is configured as a measurement bandwidth, the control unit 230 may configure to perform an RSSI measurement and a channel occupancy measurement separately for each measurement bandwidth corresponding to 20 MHz.

Alternatively, upon detecting that, as a measurement bandwidth, a PRB number that is greater than the PRB number corresponding to 20 MHz is configured, the control unit 230 may configure, based on an additional IE, as to whether an RSSI measurement and a channel occupancy measurement are to be separately performed for each measurement bandwidth corresponding to 20 MHz, or an RSSI measurement and a channel occupancy measurement are to be collectively performed on a broadband.

Alternatively, upon detecting that, as a measurement bandwidth, a PRB number that is greater than the PRB number corresponding to 20 MHz is configured, the control unit 230 may configure as to whether an RSSI measurement and a channel occupancy measurement are to be separately performed on each measurement bandwidth corresponding to 20 MHz in accordance with the number of the center frequencies configured, or an RSSI measurement and a channel occupancy measurement are collectively performed on a broadband.

<Hardware Configuration>

The block diagrams (FIG. 10 and FIG. 11) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 12:
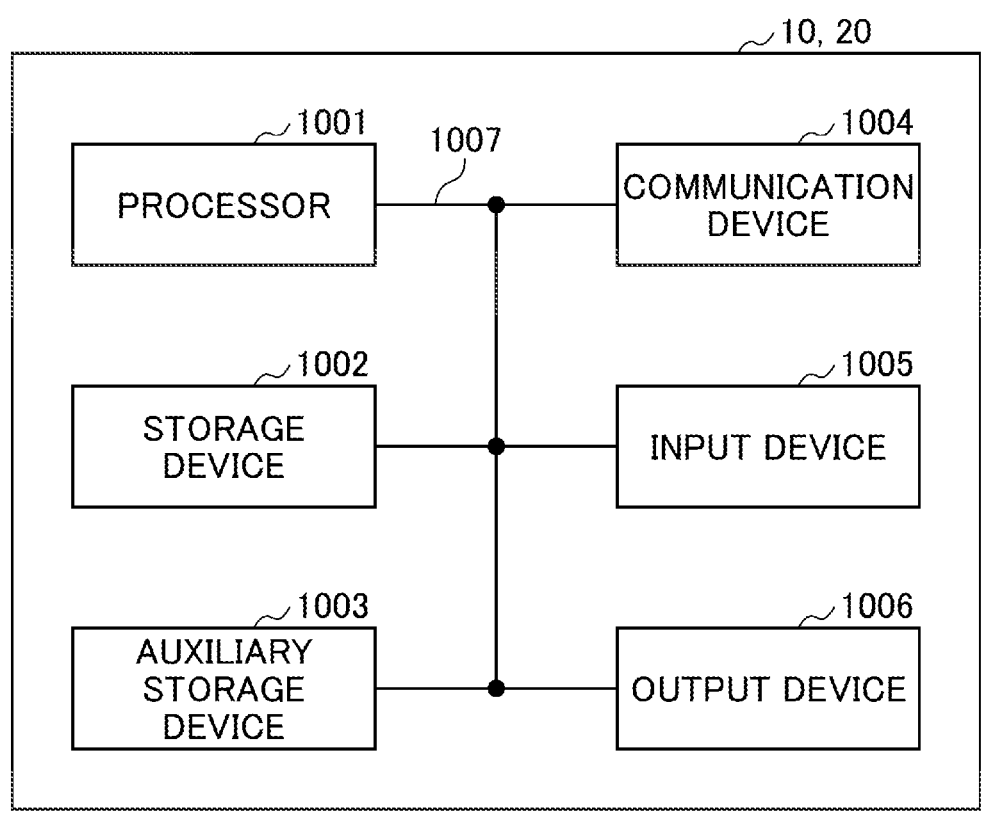
FIG. 12 is a diagram illustrating an example of a hardware configuration of the terminal and the base station.

For example, the base station 10, the terminal 20, or the like in an embodiment of the present invention may function as a computer for performing a process according to the embodiments. FIG. 12 is a diagram illustrating an example of a hardware configuration of the base station 10 and the terminal 20 according to an embodiment. Each of the base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "device" can be replaced with a circuit, device, unit, or the like. The hardware configuration of each of the base station 10 and the terminal 20 may be configured to include one or more of the depicted devices represented by 1001 through 1006, or may be configured without including some devices.

Each function in each of the base station 10 and the terminal 20 is implemented such that predetermined software (program) is read on hardware such as the processor 1001, the storage device 1002 and the like, and the processor 1001 performs an operation and controls communication by the communication device 1004 and at least one of reading and writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like.

Furthermore, the processor 1001 reads a program (program code), a software module, data, or the like from at least one of the auxiliary storage device 1003 and the communication device 1004 out to the storage device 1002, and executes various types of processes according to them. A program causing a computer to execute at least some of the operations described in the above embodiments is used as the program. For example, the control unit 130 of the base station 10 may be implemented by a control program which is stored in the storage device 1002 and operates on the processor 1001, and the other functional blocks may be implemented similarly. Various types of processes are described to be executed by one processor 1001 but may be executed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the radio communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The auxiliary storage device 1003 may be referred to as an auxiliary storage device. The above-described storage medium may be, for example, a database, a server, or any other appropriate medium including at least one of the storage device 1002 and the auxiliary storage device 1003.

The communication device 1004 is hardware (a transmitting and receiving device) for performing communication between computers via at least one of a wired network and a wireless network and is also referred to as a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex (TDD).

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The respective devices such as the processor 1001 and the storage device 1002 are connected by the bus 1007 to communicate information with each other. The bus 1007 may be configured with a single bus or may be configured with different buses between the devices.

Furthermore, each of the base station 10 and the terminal 20 may be configured to include hardware such as a microprocessor, a digital signal processor (DSP), an application specific integrated circuit (ASIC), a programmable logic device (PLD), or a field programmable gate array (FPGA), or all or some of the functional blocks may be implemented by hardware. For example, the processor 1001 may be implemented by at least one of these hardware components.

Conclusion of the Embodiments

In this specification, at least the following terminal and communication method are disclosed A terminal including a receiving unit that receives a signal; a control unit that configures a frequency resource to be measured based on an information element indicating a center frequency or a measurement bandwidth, wherein the information element is included in the signal received by the receiving unit; and a transmitting unit that transmits a result of a Received Signal Strength indicator (RSSI) measurement or a result of a channel occupancy measurement, wherein the RSSI measurement or the channel occupancy measurement is performed on the frequency resource to be measured that is configured by the control unit.

According to the above-described configuration, the terminal can appropriately configure a frequency resource for performing an RSSI measurement and a channel occupancy measurement in NR-U, and accuracy for detecting a congestion state of a channel and for detecting a hidden terminal can be enhanced.

Upon detecting that the signal includes only the information element indicating the center frequency, the control unit may set a value specified by a specification, as the measurement bandwidth.

According to the above-described configuration, a frequency resource for performing an RSSI measurement and a channel occupancy measurement can be appropriately configured for the terminal, without explicitly transmitting a notification of the measurement bandwidth to the terminal.

Upon detecting that the signal includes only the information element indicating the measurement bandwidth, the control unit may set, as the center frequency, a value of a frequency of a center of a predetermined bandwidth including a frequency of a synchronization signal.

According to the above-described configuration, a frequency resource for performing an RSSI measurement and a channel occupancy measurement can be appropriately configured for the terminal, without explicitly transmitting a notification of the center frequency to the terminal.

in a case of an upper limit value of a value configurable as the measurement bandwidth being greater than a value of a predetermined bandwidth, when the signal includes only one information element indicating the center frequency, in conjunction with the signal including only one information element indicating the measurement bandwidth, and in conjunction with a value of the measurement bandwidth indicated by the information element included in the signal being greater than the value of the predetermined bandwidth, the control unit may configure to perform an RSSI measurement and a channel occupancy measurement separately for each of the predetermined bandwidths included in a maximum frequency band used for communication by the terminal.

For example, in a case of an upper limit of a configurable measurement bandwidth being greater than the number of PRBs corresponding to 20 MHz, when the configured measurement bandwidth is greater than the number of PRBs corresponding to 20 MHz, it is necessary for the terminal to select as to whether to perform and report an RSSI measurement and a channel occupancy measurement separately for each measurement bandwidth corresponding to 20 MHz, or to perform and report an RSSI measurement and a channel occupancy measurement collectively for a wide band. In this regard, according to the above-described configuration, when the configured measurement bandwidth is greater than the number of PRBs corresponding to 20 MHz, the control unit configures to perform an RSSI measurement and a channel occupancy measurement separately for each measurement bandwidth corresponding to 20 MHz. Accordingly, an RSSI measurement and a channel occupancy measurement can be appropriately configured for the terminal.

In a case of a value configurable as the measurement bandwidth being greater than a value of a predetermined bandwidth, when the signal includes only one information element indicating the center frequency, in conjunction with the signal including only one information element indicating the measurement bandwidth, and in conjunction with a value of the measurement bandwidth indicated by the information element included in the signal being greater than the value of the predetermined bandwidth, the control unit may configure to perform an RSSI measurement and a channel occupancy measurement collectively for a maximum frequency band used for communication by the terminal.

For example, in a case of an upper limit of a configurable measurement bandwidth being greater than the number of PRBs corresponding to 20 MHz, when the configured measurement bandwidth is greater than the number of PRBs corresponding to 20 MHz, it is necessary for the terminal to select as to whether to perform and report an RSSI measurement and a channel occupancy measurement separately for each measurement bandwidth corresponding to 20 MHz, or to perform and report an RSSI measurement and a channel occupancy measurement collectively for a wide band. In this regard, according to the above-described configuration, when the configured measurement bandwidth is greater than the number of PRBs corresponding to 20 MHz, the control unit configures to perform an RSSI measurement and a channel occupancy measurement collectively for a wide band. Accordingly, an RSSI measurement and a channel occupancy measurement can be appropriately configured for the terminal.

A communication method executed by a terminal, the method including receiving a signal; configuring a frequency resource to be measured based on an information element indicating a center frequency or a measurement bandwidth, wherein the information element is included in the received signal; and transmitting a result of a Received Signal Strength Indicator (RSSI) measurement or a result of a channel occupancy measurement, wherein the RSSI measurement or the channel occupancy measurement is performed on the frequency resource to be measured that is configured by the control unit.

According to the above-described configuration, the terminal can appropriately configure a frequency resource for performing an RSSI measurement and a channel occupancy measurement in NR-U, and accuracy for detecting a congestion state of a channel and for detecting a hidden terminal can be enhanced.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the present invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the base station 10 and the terminal 20 are described using the functional block diagrams, but such devices may be implemented by hardware, software, or a combination thereof. Software executed by the processor included in the base station 10 according to the embodiments of the present invention and software executed by the processor included in the terminal 20 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present disclosure and may be provided by any other method. For example, the notification of information may be provided by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), new Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in the present disclosure may be reversed in order provided that there is no contradiction. For example, the method described in the present disclosure presents elements of various steps with an exemplary order and is not limited to a presented specific order.

In the present disclosure, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Information or the like may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (true or false), or may be performed by a comparison of numerical values (for example, a comparison with a predetermined value).

The aspects/embodiments described in this disclosure may be used alone, in combination, or switched with implementation. Notification of predetermined information (e.g., "X" notice) is not limited to a method that is explicitly performed, and may also be made implicitly (e.g., "no notice of the predetermined information").

Software can be interpreted widely to mean a command, a command set, a code, a code segment, a program code, a program, a subprogram, a software module, an application, a software application, a software package, a routine, subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL: Digital Subscriber Line)) and a radio technology (such as infrared rays or a microwave), at least one of the wired technology and the radio technology are included in a definition of a transmission medium.

Information, signals, and the like described in this disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC: Component Carrier) may be referred to as a "carrier frequency," a "cell," or the like.

The terms "system" and "network" used in the present disclosure are used interchangeably. Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "Base Station (BS)," "radio base station," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "Mobile Station (MS)," "user terminal," "User Equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, communication device, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not move during a communication operation. For example, at least one of the base station and the mobile station may be an Internet of Things (IoT) device such as a sensor.

Furthermore, the base station in the present disclosure may be replaced with a user terminal. For example, each aspect/embodiment of the present disclosure may be applied to a configuration in which communication between the base station and the user terminal is replaced with communication between a plurality of user terminals (for example, which may be referred to as Device-to-Device (D2) or Vehicle-to-Everything (V2X)). In this case, the user terminal 20 may have the functions of the terminal 20 described above. Furthermore, the terms "uplink" and "downlink" may be replaced with terms corresponding to inter-terminal communication (for example, "side"). For example, an uplink channel, a downlink channel, or the like may be replaced with side channels. Similarly, the user terminal in the present disclosure may be replaced with the base station. In this case, the terminal 20 may have the functions of the above-mentioned user terminal 20.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS (Reference Signal) and may be referred to as a pilot, depending on a standard to be applied.

A phrase "based on" used in the present disclosure is not limited to "based only on" unless otherwise stated. In other words, a phrase "based on" means both "based only on" and "based on at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

In a case in which "include," "including," and variations thereof are used in the present disclosure, these terms are intended to be comprehensive, similar to a term "provided with (comprising)." Further, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS: SubCarrier Spacing), a bandwidth, a symbol length, a cyclic prefix length, a transmission time interval (TTI: Transmission Time Interval), a number of symbols per TTI, a radio frame configuration, a specific filtering process performed in the frequency domain by a transceiver, a specific windowing process performed in the time domain by a transceiver, and the like.

The slot may include one or more symbols (Orthogonal Frequency Division Multiplexing (OFDM) symbols, Single Carrier Frequency Division Multiple Access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH transmitted using a mini slot may be referred to as a PDSCH (or PUSCH) mapping type B.

All of a radio frame, a subframe, a slot, a mini slot, and a symbol indicates a time unit for transmitting a signal. As a radio frame, a subframe, a slot, a mini slot, and a symbol, different names respectively corresponding to them may be used.

For example, one subframe may be referred to as a transmission time interval (TTI: Transmission Time Interval), or a plurality of consecutive subframes may be referred to as a TTI, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of assigning a radio resource (a frequency bandwidth, a transmission power, or the like which can be used in each user terminal) to each terminal in units of TTIs. The definition of the TTI is not limited thereto.

The TTI may be a transmission time unit such as a channel coded data packet (transport block), a code block, or a code word, or may be a processing unit such as scheduling or link adaptation Furthermore, when a TTI is provided, a time interval (for example, the number of symbols) in which a transport block, a code block, a code word, or the like is actually mapped may be shorter than the TTI.

Note that, when one slot or one mini slot is referred to as a TTI, one or more TTIs (that is, one or more slots or one or more mini slots) may be a minimum time unit of scheduling. Further, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Note that, a long TTI (for example, a common TTI, a subframe, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology.

Furthermore, a time domain of an RB may include one or more symbols and may be a length of one slot, one mini slot, one subframe, or one TTI. Each of one TTI, one subframe, or the like may be formed of one or more resource blocks.

Furthermore, one or more RBs may be referred to as a physical resource block (PRB: Physical RB), a subcarrier group (SCG: Subcarrier Group), a resource element group (REG: Resource Element Group), a PRB pair, an RB pair, or the like.

Furthermore, a resource block may be formed of one or more resource elements (RE: Resource Element). For example, one RE may be a radio resource region of one subcarrier and one symbol.

A bandwidth part (BWP: Bandwidth Part) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it is not be assumed that the UE transmits and receives a predetermined signal/channel outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the entire present disclosure, for example, when an article such as "a," "an," or "the" in English is added by a translation, the present disclosure may include a case in which a noun following the article is the plural.

In the present disclosure, a term "A and B are different" may mean "A and B are different from each other." Furthermore, the term may mean "each of A and B is different from C." Terms such as "separated," "coupled," or the like may also be interpreted similarly to "different."

Although the present invention is described above in detail, it is obvious to those skilled in the art that the present invention is not limited to the embodiments described in the specification. The present invention may be implemented as revised and modified embodiments without departing from the gist and scope of the present invention as set forth in claims.

Accordingly, the description of the specification is for the purpose of illustration and does not have any restrictive meaning to the present invention.

LIST OF REFERENCE SYMBOLS 10 base station
110 transmitting unit
120 receiving unit
130 control unit
20 terminal
210 transmitting unit
220 receiving unit
230 control unit
1001 processor
1002 storage device
1003 auxiliary storage device
1004 communication device
1005 input device
1006 output device

The invention claimed is:

1. A terminal comprising:
a receiver that receives configuration information for a Received Signal Strength Indicator (RSSI) measurement in an unlicensed frequency band; and
a processor that configures a center frequency for the RSSI measurement based on a frequency channel number included in the configuration information,
wherein the processor configures capability information of the terminal for reporting the RSSI measurement and a channel occupancy in the unlicensed frequency band,
wherein the receiver receives configuration information for RSSI measurement that can be used for a frequency other than the unlicensed frequency, and
wherein the processor configures capability information of the terminal for the received configuration information for the RSSI measurement that can be used for the frequency other than the unlicensed frequency.

2. The terminal according to claim 1, wherein, in the licensed frequency, reporting of the RSSI measurement is possible and reporting of the channel occupancy is not possible.

3. A communication system comprising:
a base station including:
- a transmitter that transmits, to a terminal, configuration information for a Received Signal Strength Indicator (RSSI) measurement in an unlicensed frequency band; and the terminal including:
- a receiver that receives the configuration information from the base station, and
- a processor that configures a center frequency for the RSSI measurement based on a frequency channel number included in the configuration information,
- wherein the processor configures capability information of the terminal for reporting the RSSI measurement and a channel occupancy in the unlicensed frequency band,
- wherein the receiver receives configuration information for RSSI measurement that can be used for a frequency other than the unlicensed frequency, and
- wherein the processor configures capability information of the terminal for the received configuration information for the RSSI measurement that can be used for the frequency other than the unlicensed frequency.

4. A communication method by a terminal, the method comprising:

receiving configuration information for a Received Signal Strength Indicator (RSSI) measurement in an unlicensed frequency band; and configuring a center frequency for the RSSI measurement based on a frequency channel number included in the configuration information,
- wherein the terminal configures capability information of the terminal for reporting the RSSI measurement and a channel occupancy in the unlicensed frequency band,
- wherein the terminal receives configuration information for RSSI measurement that can be used for a frequency other than the unlicensed frequency, and
- wherein the terminal configures capability information of the terminal for the received configuration information for the RSSI measurement that can be used for the frequency other than the unlicensed frequency.

* * * * *